(12) United States Patent
Yamazaki

(10) Patent No.: US 6,915,720 B2
(45) Date of Patent: Jul. 12, 2005

(54) VARIABLE MASS FLYWHEEL MECHANISM

(75) Inventor: Masahiro Yamazaki, Yamagata (JP)

(73) Assignee: YGK Co., Ltd., Yamagata-ken (JP)

( * ) Notice: Subject to any disclaimer, the term of this patent is extended or adjusted under 35 U.S.C. 154(b) by 83 days.

(21) Appl. No.: 10/233,476

(22) Filed: Sep. 4, 2002

(65) Prior Publication Data

US 2003/0041688 A1 Mar. 6, 2003

(30) Foreign Application Priority Data

Sep. 5, 2001 (JP) ........................................ 2001-268539

(51) Int. Cl.[7] ................................................ G05G 1/00
(52) U.S. Cl. ........................ 74/572; 74/573 R; 74/574
(58) Field of Search ............................ 74/572, 573 R, 74/573 F, 574

(56) References Cited

U.S. PATENT DOCUMENTS

| | | | |
|---|---|---|---|
| 3,983,738 A | | 10/1976 | Vlasov et al. |
| 4,262,552 A | * | 4/1981 | Honda ......................... 74/572 |
| 4,520,688 A | * | 6/1985 | Ban ............................ 74/572 |
| 5,245,889 A | * | 9/1993 | Kohno et al. ............. 74/573 R |
| 5,415,261 A | * | 5/1995 | Friedmann ............... 192/70.17 |
| 5,761,961 A | * | 6/1998 | Krauss et al. ................. 74/333 |
| 6,029,539 A | * | 2/2000 | Young ......................... 74/574 |
| 6,149,544 A | | 11/2000 | Masberg et al. |

FOREIGN PATENT DOCUMENTS

| | | |
|---|---|---|
| DE | 910 368 | 5/1954 |
| DE | 1 021 472 | 12/1957 |
| DE | 26 02 028 | 7/1977 |
| EP | 1 291 552 A3 | 8/2004 |
| GB | 2 107 428 | 9/1982 |
| JP | 56-070147 | 6/1981 |
| JP | 61119845 | * 6/1986 |

* cited by examiner

Primary Examiner—William C. Joyce
Assistant Examiner—Julie K. Smith
(74) Attorney, Agent, or Firm—Rabin & Berdo P.C.

(57) ABSTRACT

Upon a drop in engine rotation speed, a direct current voltage which periodically changes is applied to coils of pole magnets 18u–18w, thereby causing an increase or reduction in the rotation speed of the second flywheel 21. When the rotation speed of a first flywheel 11 matches the rotation speed of the second flywheel 21, a current is applied to a coil 24 to displace the second flywheel 21 to the first flywheel 11 side such that the second flywheel 21 is connected to the first flywheel 11 via dog clutches 26. Thereby, the shock which is produced upon connection of a second flywheel is reduced, and slippage occurring during connection of a second flywheel is also reduced.

11 Claims, 3 Drawing Sheets

SECTION V-V

VARIABLE MASS FLYWHEEL MECHANISM

FIELD OF THE INVENTION

The present invention relates to a flywheel mechanism which is mounted on a crankshaft of an engine in order to reduce rotary fluctuation in an engine at low speed, and particularly to the one the inertial mass of which is variable.

BACKGROUND OF THE INVENTION

A flywheel (mass damper) is typically connected to a crankshaft of an internal combustion engine in order to reduce rotary fluctuation at low speed. The greater the inertial mass of the flywheel, the smaller the rotary fluctuation, and therefore if the inertial mass of the flywheel is increased, the rotation speed during idling can be reduced, thus improving fuel consumption and emissions performance. However, when the inertial mass of the flywheel is increased, the increase in rotation speed of the engine during vehicle acceleration becomes slow, and furthermore, the effectiveness of the engine brake deteriorates when the vehicle is coasting.

JP-A-S56-70147 published by the Japanese Patent Office in 1981 discloses technology for combining the requirements at low speed with the requirements during acceleration and during coasting by providing a second flywheel that is capable of rotation relative to a crankshaft separately from a first flywheel which is connected to the crankshaft, and by connecting this second flywheel to the first flywheel at times of low speed.

SUMMARY OF THE INVENTION

However, in the aforementioned prior art, a shock occurs when the second flywheel is connected, and as a result the drivability may be impaired or the driver may feel a sense of discomfort. Moreover, even after the connection of the second flywheel, the clutch may slip due to torque variations or the like in the engine, whereby the functional capability of the flywheel may deteriorate. If slippage occurs, the flywheel may suffer abrasions or generate heat.

It is therefore an object of the present invention to reduce shock during the connection of a second flywheel in a variable mass flywheel mechanism. It is a further object of the present invention to reduce slippage during the connection of the second flywheel and in so doing further improve the functional capability of the flywheel.

In order to achieve above object, the present invention provides a variable mass flywheel mechanism comprising a first flywheel which rotates integrally with a crankshaft of an engine, a second flywheel which is capable of rotation relative to the first flywheel, a driving mechanism which controls the rotation speed of the second flywheel, and a connecting mechanism which connects the second flywheel to the first flywheel when the engine is running in a low speed rotation region. When the second flywheel is to be connected to the first flywheel, the driving mechanism controls the rotation speed of the second flywheel and the connecting mechanism connects the second flywheel to the first flywheel after matching the rotation speed of the second flywheel and the rotation speed of the first flywheel.

The details as well as other features and advantages of this invention are set forth in the remainder of the specification and are shown in the accompanying drawings.

DESCRIPTION OF THE PREFERRED EMBODIMENTS

Figure 1:
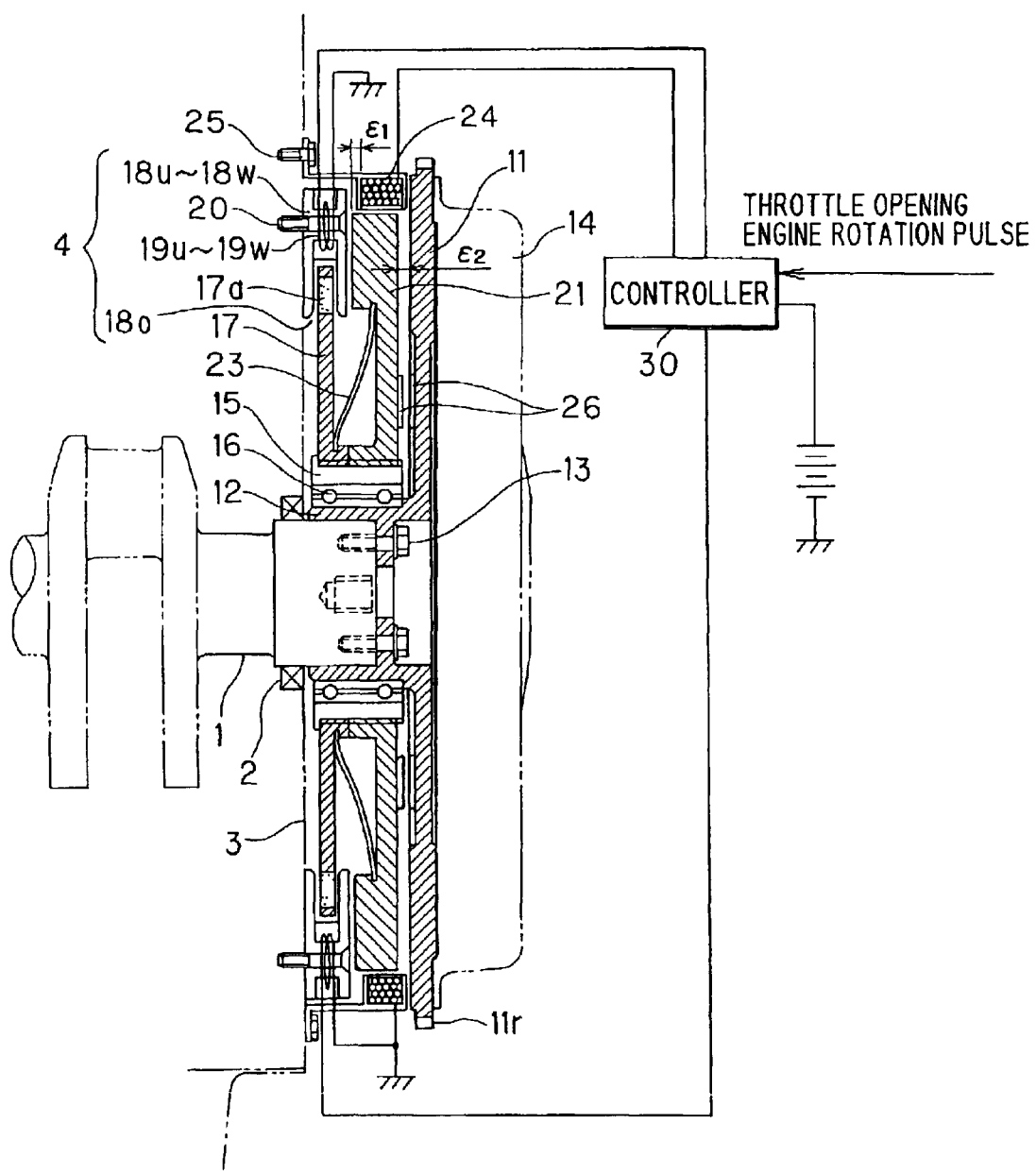
FIG. 1 is a cross-sectional view of a variable mass flywheel mechanism according to the present invention.

Referring to FIG. 1 of the drawings, this figure shows a longitudinal cross section of a variable mass flywheel mechanism in accordance with the present invention. The rear end of a crankshaft 1 of an engine (not shown) is inserted into a tubular flywheel hub 12 which is provided on the inner circumference of a first flywheel 11. The first flywheel 11 is connected to the rear end of the crankshaft 1 by bolts 13 and thus rotates integrally together with the crankshaft 1. A ring gear 11r is formed on the outer circumference of the first flywheel 11. A starter motor (not shown) is meshed with the ring gear 11r. In the drawing, 2 is a bearing which supports the crankshaft 1 in a cylinder block 3, and 14 is a clutch cover.

Figure 2:
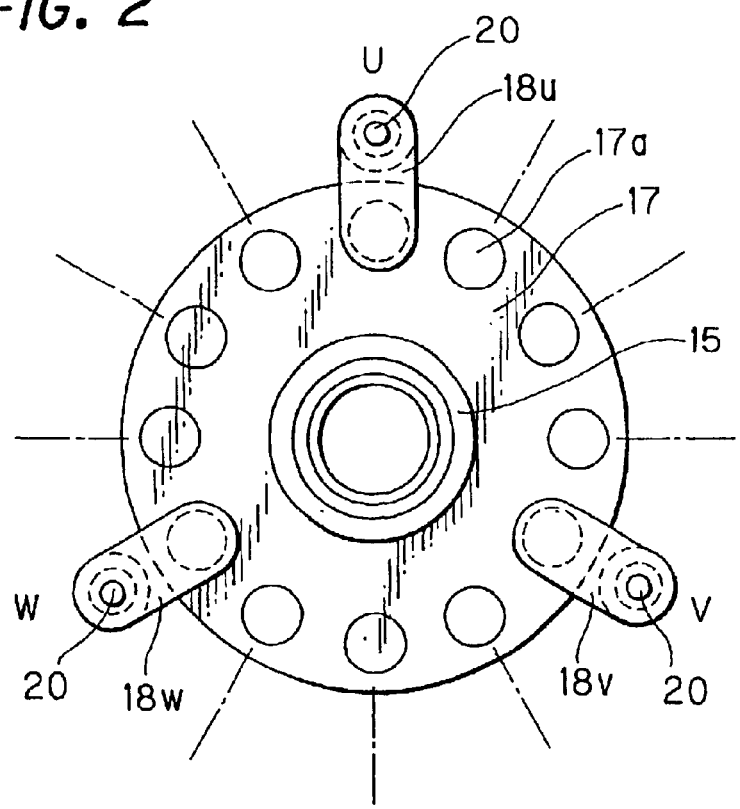
FIG. 2 is a plan view of a rotor disk and pole magnets.

A tubular member 15 is rotatably supported on the outer circumference of the flywheel hub 12 via a bearing 16. A rotor disk 17 is securely mounted integrally on the outer circumference of the tubular member 15 near the engine by means of shrinkage fitting or the like. Further, as is illustrated in FIG. 2, three pole magnets 18u–18w are fixed by bolts 20 onto the rear end of the cylinder block 3 (or ladder beam) of the engine facing the rotor disk 17 at equal intervals in the circumferential direction. The outer circumference side of the rotor disk 17 is inserted into opening portions 18b in the pole magnets 18u–18w which become electromagnets by being excited by a current which is supplied to coils 19u–19w.

The rotor disk 17 is constituted by a nonmagnetic material such as aluminum. As is illustrated in FIG. 2, permanent magnets 17a are implanted in a number of an integral multiple of three into the rotor disk 17 on the same circumference, at equal intervals, and facing the aforementioned pole magnets 18u–18w. Here, the number of permanent magnets 17a is 12, but this may be reduced according to necessity. The permanent magnets 17a, pole magnets 18u–18w and coils 19u–19w constitute a brushless direct current motor 4. When a periodically changing direct current voltage is applied to the coils 19u–19w of the pole magnets 18u–18w, the rotor disk 17 can be caused to rotate at an arbitrary rotation speed.

Figure 3:
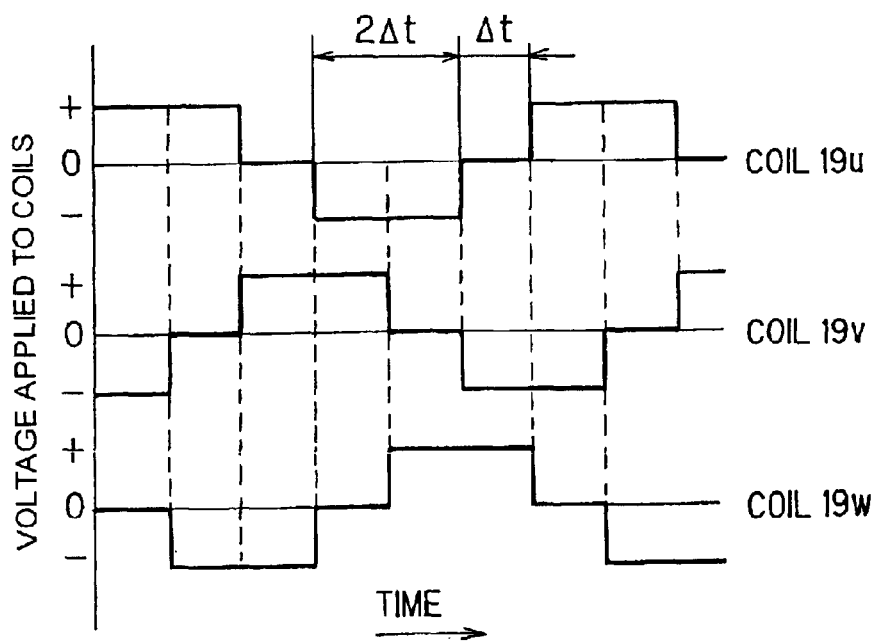
FIG. 3 is a time chart showing the state of change in a voltage which is applied to coils.

For example, as is illustrated in FIG. 3, if a positive voltage and a negative voltage are alternately applied to the coil 19u in time periods of 2Δt with an interval of Δt therebetween, and the same voltage is applied to coil 19v and coil 19w at respective delays of 2Δt and 4Δt with respect to each application to the coil 19u, the rotor disk 17 can be caused to rotate. Further, by adjusting Δt, the rotation speed of the rotor disk 17 can be controlled.

Returning to FIG. 1, the constitution of the flywheel mechanism will be explained further. A second flywheel 21 is fitted onto the outer circumference of the tubular member 15 near the first flywheel 11 so as to be capable of sliding in the axial direction by means of spline grooves and so as to be incapable of rotation relative to the tubular member 15. The second flywheel 21 is constituted by a magnetic material such as iron. The thickness of the second flywheel 21 in the axial direction on the outer circumference side is thicker than the thickness in the axial direction on the inner circumference side in order to increase the inertial mass while suppressing mass.

The rotor disk 17 and the second flywheel 21 are connected by a diaphragm-type return spring 23. When the second flywheel 21 moves in a direction approaching the first flywheel 11, the return spring 23 causes a force to act upon the second flywheel 21 to return the second flywheel 21 to the cylinder block 3 side. The return spring 23 also restricts relative rotation between the rotor disk 17 and the second flywheel 21. The rotor disk 17 and the tubular member 15 are also incapable of relative rotation, and hence the tubular member 15, rotor disk 17 and second flywheel 21 rotate integrally.

Further, a large coil 24 is provided on the outside of the second flywheel 21 so as to surround the periphery thereof. The coil 24 is provided in a position which is offset in respect of the second flywheel 21 by $\epsilon_1$ in the axial direction on the first flywheel 11 side. The coil 24 is fixed to the cylinder block 3 by bolts 25.

Figure 4:
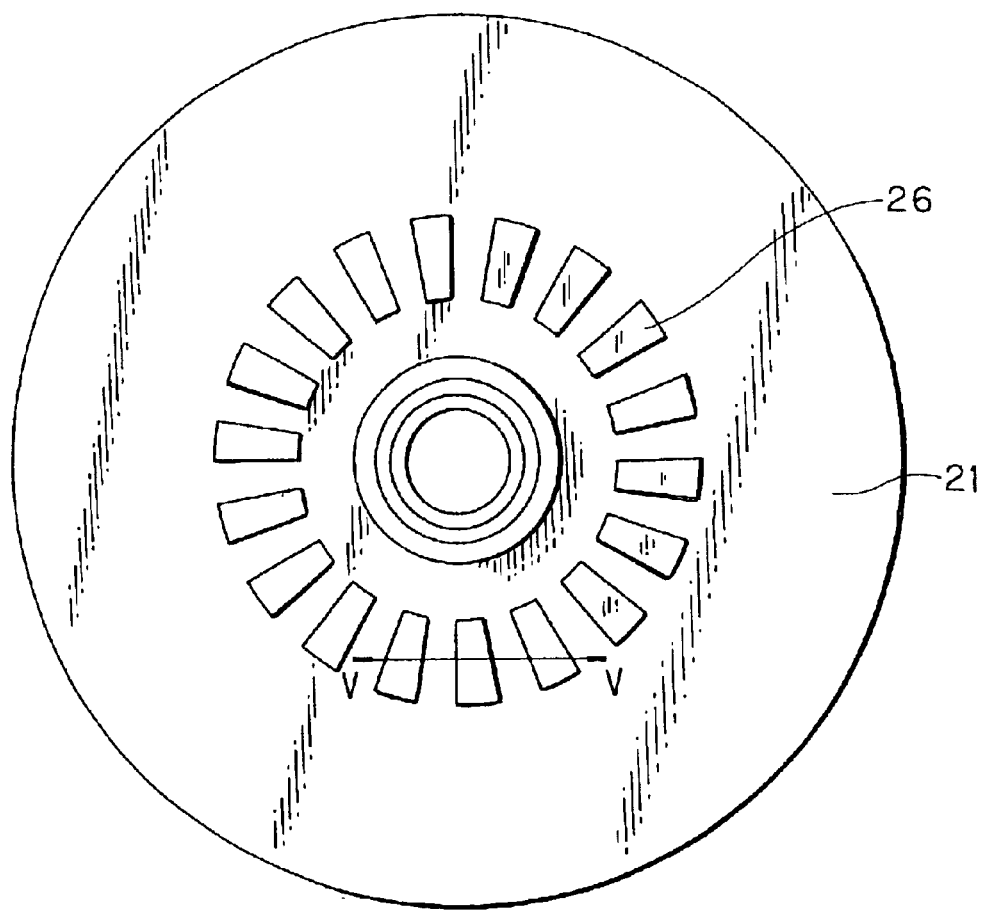
FIG. 4 is a plan view of a second flywheel.
Figure 5:
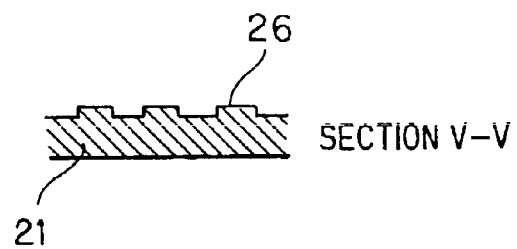
FIG. 5 is a cross-sectional view along the V—V line in FIG. 4.

The amount of offset $\epsilon_1$ of the coil 24 is set equal to the gap $\epsilon_2$ between the first flywheel 11 and the second flywheel 21. Further, as is illustrated in FIGS. 4 and 5, a plurality of dog clutches 26 are formed in the circumferential direction on the opposing surfaces of the second flywheel 21 and the first flywheel 11. The dog clutches are clutches for fastening two rotating disks together so as to be incapable of relative rotation by means of coupling together convex portions formed on one of the rotating disks with concave portions formed in a corresponding shape on the other rotating disk. When a current is applied to the coil 24 such that the second flywheel 21 moves against the returning force of the return spring 23 in a direction approaching the first flywheel 11, the first flywheel 11 and the second flywheel 21 are connected by the dog clutches 26 so as to be incapable of relative rotation.

When the current to the coil 24 is cut off, the second flywheel 21 is drawn back to the cylinder block 3 side by the returning force of the return spring 23. As a result, the dog clutches 26 are released so as to unlock the connection between the first flywheel 11 and the second flywheel 21. Once the dog clutches 26 have been released, the second flywheel 21 becomes independent of the first flywheel 11 and the crankshaft 1 so as to rotate freely on the flywheel hub 12.

Control of the second flywheel 21 is performed by a controller 30 which includes a microprocessor, memory, an input/output interface. Signals indicating the driving condition of the vehicle including a throttle opening signal and engine rotation speed signal (engine rotation pulse) are inputted into the controller 30. The controller 30 controls the rotation speed of the second flywheel 21 in accordance with the driving condition of the vehicle and performs connection/disconnection of the first flywheel 11 and the second flywheel 21.

Specifically, when it is determined, while the vehicle is running, that the throttle opening of the engine has become smaller and that the engine rotation speed has fallen below a predetermined rotation speed, a voltage such as that shown in FIG. 3 is applied to the coils 19$u$–19$w$ of the pole magnets 18$u$–18$w$, whereby the rotation speed of the rotor disk 17 is caused to increase by reducing $\Delta t$ in FIG. 3. The predetermined rotation speed is set to a rotation speed which is slightly higher than the idling rotation speed, for example 700 rpm. As described above, the rotor disk 17 and the second flywheel 21 are both restrained in the rotational direction via the tubular member 15 and the return spring 23, and therefore the rotation speed of the second flywheel 21 also rises in accompaniment with the increase in the rotation speed of the rotor disk 17. Conversely, when the second flywheel 21 is rotating at a higher rotation speed than the first flywheel 11, the rotational energy of the second flywheel 21 is regenerated in the coils 19$u$–19$w$, whereby the rotation speed of the second flywheel 21 is reduced.

Then, when the rotation speeds of the rotor disk 17 and the second flywheel 21 are aligned with the rotation speed of the first flywheel 11, a current is applied to the coil 24 such that the second flywheel 21 is displaced against the returning force of the return spring 23 in a direction approaching the first flywheel 11. Whether or not the rotation speed of the first flywheel 11 and the rotation speed of the second flywheel 21 are in alignment is judged according to whether $\Delta t$ has become a value corresponding to the engine rotation speed or whether the regenerated power has become zero. As a result, the dog clutches 26 are fastened together such that the first flywheel 11 and the second flywheel 21 rotate integrally.

When the second flywheel 21 is connected to the first flywheel 11, the inertial mass around the crankshaft 1 increases, and hence even if the engine rotation speed falls to a speed (for example 400 rpm) which is considerably lower than a conventional idling speed, the engine can maintain stable rotation. This is due to the fact that the coefficient of variation of the engine rotation speed $\delta$ can be expressed by the equation $$\delta = \frac{1}{I \cdot \omega_m} \cdot \int (T - T_m) dt$$

where I is the inertial mass, $\omega_m$ is the angular speed of rotation (average value), T is a momentary torque value, and $T_m$ is an average torque value, and if the inertial mass I is increased, the angular speed of rotation $\omega_m$ can be reduced without increasing the coefficient of variation of the rotation speed $\delta$.

If, for example, it is assumed that the inertial mass is doubled due to the connection of the second flywheel 21 to the first flywheel 11, then the rotation speed can be lowered by half during idling while suppressing the coefficient of variation of the rotation speed to a conventional level. If the rotation speed during idling can be lowered, then loss due to friction in various regions of the engine can be reduced. As a result, a small amount of energy is sufficient to maintain rotation, leading to an improvement in fuel consumption. Moreover, the total amount of exhaust decreases, thereby enabling a reduction in the amount of exhaust emissions.

When the rotation speed during idling is lowered, the rotation speeds of the alternator, air conditioning compressor and so on also decrease. However, by appropriately setting the pulley ratio, decreases in the amount of generated power and the performance of the air conditioning can be prevented.

Further, according to the present invention, when the second flywheel 21 is to be connected to the first flywheel 11, the rotation speeds of the two components are aligned prior to connection, and thus no shock is produced upon connection, whereby no sense of discomfort is transmitted to the driver. Furthermore, the first flywheel 11 and the second flywheel 21 are connected by the dog clutches 26, and thus no slippage occurs between the two components upon connection, whereby heat generation and abrasions due to slippage can be suppressed.

Moreover, a current is supplied to the coils 19$u$–19$w$ even during idling following the connection of the second flywheel 21 to the first flywheel 11 such that if the second flywheel 21 is driven at idling rotation speed, rotation during idling can be further stabilized. Alternatively, if, when the engine rotation speed is higher than the idling rotation speed, the rotation speed is lowered by regenerating the rotational energy, and if, when the engine rotation speed is lower than the idling rotation speed, the rotation speed is raised by driving the second flywheel 21, rotational speed variation during idling can be suppressed even further.

Then, when the driver steps on the accelerator pedal with the second flywheel 21 in a state of connection such that the throttle opening increases and the engine rotation speed rises, the controller 30 cuts off the current to the coil 24 at the time when the engine rotation speed has reached the aforementioned predetermined rotation speed or a rotation speed which is slightly higher than the predetermined rotation speed (for example 750 rpm), whereby the second flywheel 21 is separated from the first flywheel 11. In order to prevent frequent repetition of the connection/disconnection of the second flywheel 21 when the engine is being driven in the vicinity of the aforementioned predetermined rotation speed, the rotation speed during disconnection is set slightly higher than the rotation speed during connection, thereby creating hysteresis.

When the vehicle is traveling at a low gear speed, the inertial mass of the flywheel is comparable to the mass of the vehicle. However, by disconnecting the second flywheel 21, the inertial mass around the crankshaft 1 can be reduced, thereby improving acceleration performance such that fuel consumption during acceleration can be reduced. Further, since the rotational energy of the first flywheel 11 is low, the engine braking effect can be increased and the running performance during coasting can be improved.

Note that in the above embodiment, the rotor disk 17 and the second flywheel 21 are driven using the permanent magnets 17a and the pole magnets 18. However, the number, arrangement and so forth of the permanent magnets 17a and the pole magnets 18 may be modified according to necessity. If, for example, the number of pole magnets 18 is increased, the driving torque of the rotor disk 17 and thereby the maximum rotation speed are increased.

Another mechanism may also be used as the driving mechanism of the rotor disk 17. For example, a motor which drives the rotor disk 17 via a gear may be provided adjacent to the rotor disk 17 and the rotor disk 17 may be driven using this motor.

Further, when the second flywheel 21 is to be connected to the first flywheel 11, the rotation speeds of the two components are aligned prior to connection. However, even if the rotation speeds are not exactly aligned, shock during connection can be reduced as long as the rotation speeds are substantially aligned. A case in which the rotation speeds of the first flywheel 11 and the second flywheel 21 are substantially aligned when the two components are connected is included within the scope of the present invention.

Moreover, the timing of the alignment of the rotation speed of the second flywheel 21 with the rotation speed of the first flywheel 11 is determined based on Δt. However, this determination may be made by directly detecting the rotation speed of the rotor disk 17 or the second flywheel 21. Alternatively, determination may be made from an induced electromotive force produced in the coils 19u–19w.

The above embodiment is applied to an engine equipped with a manual transmission, but the present invention may of course be applied to an engine equipped with an automatic transmission. In this case, the first flywheel 11 and the clutch cover 14 in FIG. 1 are replaced with a drive plate and a torque converter respectively.

What is claimed is:

1. A variable mass flywheel mechanism comprising:
    a first flywheel which rotates integrally with a crankshaft of an engine;
    a second flywheel which is capable of rotation relative to the first flywheel;
    a driving mechanism which controls the rotation speed of the second flywheel; and
    a connecting mechanism which connects the second flywheel to the first flywheel when the engine is running in a low speed rotation region,
    wherein, when the second flywheel is to be connected to the first flywheel, the driving mechanism controls the rotation speed of the second flywheel and the connecting mechanism connects the second flywheel to the first flywheel only after matching the rotation speed of the second flywheel and the rotation speed of the first flywheel.

2. The flywheel mechanism as defined in claim 1, wherein the driving mechanism is an electric motor.

3. The flywheel mechanism as defined in claim 2, further comprising a rotor disk which rotates integrally with the second flywheel, the electric motor driving the second flywheel by driving the rotor disk.

4. The flywheel mechanism as defined in claim 3, wherein the electric motor includes a permanent magnet provided on the rotor disk and an electromagnet beside the rotor disk.

5. The flywheel mechanism as defined in claim 1, wherein the second flywheel is manufactured from a magnetic material, and
    the connecting mechanism comprises a coil provided on the outside of the second flywheel, the connection mechanism displacing the second flywheel in a direction approaching the first flywheel by applying a current to the coil and thereby connecting the second flywheel to the first flywheel.

6. The flywheel mechanism as defined in claim 5, wherein the coil is provided in an offset position further toward the first flywheel than the second flywheel.

7. The flywheel mechanism as defined in claim 1, wherein a dog clutch is formed on the face of the second flywheel opposing the first flywheel so as to engage the second flywheel with the first flywheel when the second flywheel is connected to the first flywheel.

8. The flywheel mechanism as defined in claim 1, wherein the connecting mechanism connects the second flywheel to the first flywheel after the engine rotation speed has dropped to a first rotation speed, and releases the connection between the first flywheel and the second flywheel after the engine rotation speed has risen to a second rotation speed which is higher than the first rotation speed.

9. The flywheel mechanism as defined in claim 1, wherein, when the first flywheel and the second flywheel are connected, the driving mechanism controls the rotation speed of the second flywheel such that the rotation speed of the second flywheel becomes equal to the idling rotation speed of the engine.

10. The flywheel mechanism as defined in claim 1, wherein the driving mechanism includes
    means for detecting the rotation speed of the engine;
    speed increasing means, responsive to the detected rotation speed of the engine, for increasing the rotation speed of the second flywheel to and match the rotational speed of the first flywheel, when the engine is in the low speed rotation region, said connecting mechanism connecting the second flywheel to the first flywheel only when the speed of the second flywheel is the same as that of the first flywheel.

11. The flywheel mechanism as defined in claim 10, wherein the speed increasing means includes a controller responsive to an engine rotation speed signal for controlling the rotation speed of the second flywheel to match the rotation speed of the second flywheel to that of the first flywheel.

* * * * *